Patented June 1, 1948

UNITED STATES PATENT OFFICE 2,442,534

MONO- AND/OR DIGLYCERIDE PREPARATION

Eddy W. Eckey, Wyoming, Ohio, assignor to The Procter & Gamble Company, Cincinnati, Ohio, a corporation of Ohio No Drawing. Application November 6, 1945, Serial No. 627,090

14 Claims. (Cl. 260—410.7)

This invention relates to interesterification or the rearrangement of fatty acid radicals in glycerides having unesterified hydroxyl groups and more specifically to a process whereby the interesterification may be controlled to yield products of a desired constitution.

It is an object of the present invention to provide a process for converting a major proportion of higher melting constituents of fats and fatty oils (hereinafter collectively referred to in the specification and claims as "fats") into glycerides having at least one unesterified glycerol hydroxyl group. Another object is to provide a process for the preparation of highly saturated mono- and diglycerides from fats. A still further object is to produce glyceride oils substantially free from combined saturated fatty acids. Other objects will be apparent from the following detailed description and examples.

In my related copending application Serial No. 562,062, filed November 6, 1944, I have disclosed how interesterification of fats (or "molecular rearrangement" as the process is referred to therein) may be brought about by a treatment of the fats with a suitable low temperature interesterification catalyst at a temperature sufficiently low that solid glycerides crystallize out from the reaction mixture as they are formed thereby inducing a continuation of the interesterification reaction to such an extent that the physical properties of the reacted batch of fats or oils may be controlled to produce new products within a desired range of properties such as melting point and solidifying point. Essentially the process effects an increase in the saturated and unsaturated triglycerides in the oil with a corresponding decrease in the content of mixed saturated-unsaturated triglycerides, unless special precautions or modifications of conducting the process to induce the crystallization of a particular type of mixed glyceride are taken.

In accordance with the present invention, interesterification with simultaneous crystallization is practiced on the fat in the presence of an organic compound having at least one unesterified alcoholic hydroxyl group with the result that insoluble, high melting mono- and/or diglycerides formed in the reaction crystallize from the reaction mix.

Since mono- and diglycerides are higher melting and less soluble in fat than the corresponding triglycerides, and since in the presence of a sufficient proportion of unesterified hydroxyl groups there is, according to the mathematical law of probability, a statistically greater chance to form saturated diglyceride or monoglyceride than to form saturated triglyceride, especially when the proportion of saturated constituents in the fat is small, it is possible to bring about a more complete concentration of the saturated fatty acids into a fully saturated fraction when the fraction that crystallizes during interesterification is monoglyceride and/or diglyceride.

The mono- and/or diglycerides which must be present during low temperature interesterification in accordance with the instant process may be preformed and then added to the fat, they may be preformed in the fat prior to interesterification by any suitable alcoholysis reaction or they may be formed in the fat at the beginning of or during the low temperature interesterification, the low temperature interesterification catalyst being active in catalyzing the alcoholysis reaction.

In that modification of my invention in which the mono- and/or diglycerides are added to the fat to be processed, mono- and/or diglycerides from any source may be employed provided of course their solubility in the fat is greater than that of the mono- and/or diglycerides which are to be crystallized during the interesterification reaction.

In the case where the mono- and diglycerides are preformed in the fat substantially prior to interesterification, the fat or a portion thereof may be reacted with glycerol or other suitable alcoholic substance at a relatively high temperature, with or without a catalyst to convert part of the fat to mono- and diglycerides. These mono- and diglycerides in the fat will then exist as a mixture containing the various fatty constituents of the fat in about the same proportion to each other as in the original triglyceride fat. When the glyceride mixture containing these preformed mono- and diglycerides is then subjected to interesterification at sufficiently low temperature, the higher melting mono- and/or diglycerides of low solubility crystallize, thereby promoting further interesterification and the formation of additional high melting mono- and/or diglycerides of low solubility. As the process proceeds, the higher melting fatty acid constituents of the fat become concentrated in the crystallized fraction. When this process has proceeded to the desired degree, the reaction is terminated by the addition of acid, water, or other material that will render the low temperature interesterification catalyst inactive.

In another modification of the process wherein mono- and diglycerides are preformed in the fat, glycerol or other alcoholic substance such as methanol is added to the fat at the beginning of or during the low temperature interesterification reaction. If, for example, methanol is added to fat in the presence of low temperature interesterification catalysts (which are also alcoholysis catalysts), the methanol combines with part of the fatty acids of the fat to form methyl esters. A quantity of glyceryl hydroxyl equivalent to the methyl esters formed is set free in the form of a mixture of diglycerides, monoglycerides, and free glycerol, the proportions depending upon the quantity of methanol employed. If the temperature is sufficiently low and a catalyst active at such temperature is present to cause continued alcoholysis and interesterification, the less soluble higher melting mono- and/or diglycerides will crystallize and continuation of the simultaneous crystallization, alcoholysis and interesterification causes the concentration of the higher melting constituents in the crystallized mono- and/or diglyceride fraction. Correspondingly the liquid fraction, consisting of methyl esters and glycerides, becomes depleted of its higher melting fatty acid constituents.

Various alcohols and alcoholic substances other than methanol which are at least partially soluble in the fat or which may be brought into a state of solution in the fat with the aid of a mutual solvent such as dioxane may be employed in the practice of this feature of the invention, and in some cases special advantages are associated with the use of particular alcohols. Among the alcoholic substances that find use in forming the mono- and diglycerides are: methanol, ethanol, propanol, isopropanol, butanol, secondary butanol, tertiary butanol, amyl alcohol, acetone glycerol, allyl alcohol, glycidol, ethylene glycol, polyethylene glycol, diglycerol, polyglycerol, penta-erythritol, sorbitol, mannitol, cyclohexanol, glycol monoethers, glycerol ethers, monoacetin, monobutyrin, lauryl alcohol, cetyl alcohol, benzyl alcohol, ethanolamines, non-acid alcohol esters and salts of hydroxy carboxylic acids such as diethyl tartrate, potassium tartrate, ethyl lactate, sodium glycollate, and other aliphatic and aliphatic-aromatic alcoholic hydroxy-containing substances which are at least partially soluble in the glyceride system and which are not acid enough to neutralize and thus inactivate the low temperature interesterification catalyst. As disclosed below, substances more acid than phenol would not be suitable and in the claims the term "non-acid" is to be so interpreted.

In the use of those alcohols which have high melting points or very little solubility in the fat, such as pentaerythritol for example, it is advantageous to bring about alcoholysis of the fat or part of the fat with the alcohol at high temperature or in the presence of a mutual solvent before the beginning of the low temperature interesterification process. It is to be understood that in defining the alcoholic substances hereafter in the specification and claims the language "at least partially soluble" is intended to include those alcoholic substances which may be brought into a state of solution in the glyceride system with the aid of a mutual solvent.

In connection with that feature of the invention employing preformation of the mono- and diglycerides in the fat by the reaction thereof with the alcoholic substance, it should be pointed out also that it is practical to employ crude fats, especially those substantially free of heat coagulatable phosphatides, such as bleached tallow, without previous refining. The free fatty acids of the crude fat become esterified by the alcohol and thereby are rendered harmless to the catalyst in the subsequent interesterification reaction.

When glycerin is reacted with a triglyceride to preform mono- and diglycerides in the fat, the product will consist of a mixture of mono-, di- and triglycerides and unreacted glycerol, the amounts of each constituent depending on the proportion of unesterified hydroxyl groups present when equilibrium is reached. Similarly the form of the solid glyceride which precipitates during the interesterification process will be mono-, di-, or triglyceride, or mixtures thereof, depending among other things on the unesterified hydroxyl groups and on the proportion of high melting fatty acid in the fatty acid mixture constituting the fat. With a large unesterified hydroxyl group concentration, the solid glyceride precipitated during interesterification will tend to be largely monoglyceride, whereas if the concentration is moderately low the crystallized solid fraction will tend to be predominantly diglyceride. If the unesterified hydroxyl group concentration is very low, the solids precipitated may be triglyceride, the unesterified hydroxyl groups becoming concentrated in the liquid fraction.

It is well known that triglyceride fats have more than one melting point, depending on the crystal form existing. This same situation applies to mono- and diglycerides, and I have found that although the melting point of the highest melting form of monoglyceride is higher than the melting point of the highest melting form of the corresponding diglyceride, the diglyceride may exist in predominating amount in the crystallized fraction when the glyceride mixture comprises both mono- and diglyceride. My explanation for this behavior, to which I do not wish to be limited, is that the highest melting crystalline form of diglyceride (which may be higher melting than a lower melting crystalline form of monoglyceride) is rapidly formed, whereas the highest melting crystalline form of the monoglyceride is but slowly formed. Consequently if diglyceride crystals are first to form, the reaction may well thus be seeded with diglyceride and in many instances the reaction product will have a higher ratio of diglyceride to monoglyceride in the solid fraction than in the liquid fraction.

It is to be understood that the glyceride which crystallizes is strongly influenced by seeding, and mono- or diglycerides may be preferentially precipitated in many instances by seeding the reaction mix with the desired preformed glyceride.

In that practice of the invention in which alcoholysis precedes interesterification, no fixed usage range for alcoholic substance can be set without unduly limiting the scope of the invention. Obviously the amount of the alcoholic substance employed will vary with its molecular weight, the number of unesterified hydroxyl groups in the molecule, the proportion of the higher melting constituents in the fat being treated, etc. In the case of an interesterification process involving cottonseed oil in which mono- and diglycerides have been preformed by reaction with glycerol for example, partially esterified glycerides will form and crystallize from the reaction mix when the amount of glycerol employed in the alcoholysis ranges from about one percent of the oil to amounts over and above that theoretically necessary to convert all the glycerides in the cottonseed oil to fatty acid monoglycerides, that is, amounts of glycerol as high as 18 to 25 per cent.

Since the temperatures at which most fatty glyceride mixtures containing mono- and diglycerides can begin to form solid crystals are below 180° F., the temperature at which the rearrangement is conducted in accordance with this invention is for most practical applications below 180° F., sufficiently high that a substantial proportion of the glyceride mixture is liquid and sufficiently low to permit the crystallization from the liquid glycerides of solid mono- and/or diglycerides of low solubility formed in the rearrangement. The process has been successfully operated at final temperatures as low as 50° F., but even lower temperatures may be employed if desired.

At the end of the simultaneous interesterification and crystallization process, the solid glycerides may or may not be physically removed from the liquid portion of the reaction product, depending on the purpose of the rearrangement.

In some applications of the process the aim will be to remove the saturated constituents from the fat, and in such cases the solid may be removed by filtration with or without the aid of a solvent or by other means. In some instances it will be advantageous to inactivate the catalyst first, then melt the glyceride mixture and subject it to crystallization to get a formation of crystals that will separate from the liquid fraction readily.

The liquid fraction or olein obtained from such separation may be used as such or may be reacted with acids to esterify the unesterified hydroxyl groups contained therein. Such acid may be a fatty acid of high molecular weight, such as oleic, stearic, linoleic, linolenic, or mixtures of such acids as may be derived from vegetable and animal oils and fats. The lower molecular weight fatty acids of the fatty acid series such as acetic, propionic, butyric, valeric, etc. may also be used. For some purposes it may be desirable to employ a non-fatty mono- or polycarboxylic acid such as phthalic acid. In place of individual acids or mixtures thereof, other materials such as acid halides, including lauric acid chloride, linolenic acid chloride, or anhydrides such as acetic anhydride or phthalic anhydride, may be used to esterify the hydroxyl groups.

mospheric pressure and then blown with steam at subatmospheric pressure at 175° C. for a brief period to reduce the acid number. By analytical determination the resulting product had an acid number of 0.7 and contained 18.4% combined glycerol, which indicated that the product consisted largely of mono- and diglycerides of the palm oil fatty acids.

The thus prepared reaction product of palm oil and glycerin was placed in a flask equipped with a mechanical agitator and with inlets and outlets for nitrogen to exclude air. The glyceride mixture was heated to 150° F. and then cooled to 105° F. To the glycerides under vigorous agitation was added a suspension of finely divided sodium methoxide in xylene in quantity to give about 0.2% sodium methoxide based on the weight of the glyceride mixture. After 15 minutes of agitation, the mixture was divided into two parts, transferred to containers which were closed after replacing air with nitrogen and then placed in a constant temperature room at 100° F. to permit simultaneous crystallization and interesterification to take place for 24 hours in one case and for 72 hours in the other case. The glyceride mixtures resulting from both reactions were semi-solid. At the end of the respective reaction periods and without substantial change in temperature, the mixtures were treated with phosphoric acid to inactivate the catalyst, then melted, washed with water, filtered and dried.

To show the effect produced by the process, samples of the glyceride mixtures before and after interesterification were dissolved in 10 volumes of petroleum ether and allowed to crystallize at 50° F. The solid and liquid fractions obtained by filtration had the following characteristics after removal of the solvent.

|  | Solid Fraction | | | Liquid Fraction | |
|---|---|---|---|---|---|
|  | Yield | Iodine Number | Hydroxyl Number | Iodine Number | Hydroxyl Number |
| Palm oil after high-temperature reaction with glycerin and before interesterification | *Per cent* 18.7 | 4.8 | 239 | 59.7 | 104 |
| Palm oil after reaction with glycerin, followed by interesterification for 24 hrs. at 100° F | 33.9 | 3.7 | 247 | 72.6 | 90 |
| Palm oil after reaction with glycerin, followed by interesterification for 72 hours at 100° F | 36.2 | 6.1 | 242 | 73.2 | 75 |

The following examples will illustrate the manner in which the invention may be practiced, but it is to be understood that the invention is not limited to the conditions or limitations given therein.

*Example 1.—Palm oil—reacted with glycerol at high temperature, then subjected to interesterification at 100° F.*

500 parts of alkali refined palm oil were heated under reduced pressure in a flask equipped with an inlet for admitting steam under the oil near the bottom of the flask. While the oil was agitated by means of a current of steam passing therethrough at low pressure, a solution consisting of 2 parts of sodium hydroxide in 80 parts of 95% glycerol was added slowly. The mixture was agitated vigorously at 170° C. for one hour and then cooled to 100° C. 2 parts of 85% phosphoric acid were then added to neutralize the alkalinity of the mixture.

The product was removed from the flask, mixed with kieselguhr and filtered. The filtered glyceride mixture had by analysis an acid number of 4.8. It was then heated for 6 hours at 225° C. in a flask under a blanket of nitrogen at at- The above data show that the quantity of substantially completely saturated glyceride in the fat (including substantially completely saturated mono-, di- and triglyceride) was increased substantially by the interesterification with simultaneous crystallization at 100° F. Also it is to be observed that as the hydroxyl and iodine numbers indicate, the substantially completely saturated solid fraction recovered from crystallization from the solvent was largely monoglyceride. (The theoretical hydroxyl numbers for the mono- and diglycerides of palm oil fatty acids are about 325 and 95 respectively.) The data obtained on the liquid fraction indicate that the process resulted in an increase in the content of unsaturated constituents and a reduction in the content of incompletely esterified glycerides in this fraction.

*Example 2.—Palm oil—alcoholized with methanol just prior to interesterification at 100° F.*

To 100 parts of palm oil in completely liquefied condition were added 0.2 part of sodium methoxide in solution in 3 parts methanol. The mixture was vigorously agitated to effect alcoholysis and was then stored in a container under a blanket of nitrogen for 24 hours at 100° F. to permit interesterification and simultaneous crystallization. The resulting glyceride mixture was semi-solid, and, without change in temperature, was treated with dilute phosphoric acid to render the sodium methoxide inactive. Thereafter the glycerides were washed, filtered and dried. To determine the extent of change a sample of the glycerides was dissolved in 10 volumes of petroleum ether and held at 50° F. for about 24 hours. The solid fraction which precipitated was separated from the solution of the liquid fraction in petroleum ether by filtration. The precipitate was thereafter washed with cold petroleum ether. The respective fractions after removal of the solvent had the following properties in comparison with the original palm oil.

the same and remove xylene. The product so produced had the following characteristics:

Cloud point _____°C__ 46.3
Capillary melting point _____°C__ 55.5
Solid fraction obtained by crystallization from 10 volumes of petroleum ether at 32° F. :
   Yield _____ per cent__ 15.4
   Melting point (capillary) _____ °C__ 65.6
   Iodine number _____ 2.3

The interfacial tension of a solution of the solid fraction in triglyceride fat as determined by allowing the fat to rise through distilled water from a standard orifice indicated that the solid fraction contained about 10% of monoglyceride.

| | Solid Fraction | | | | Liquid Fraction | |
|---|---|---|---|---|---|---|
| | Yield | Iodine Number | Hydroxyl Number | Capillary Melting Point | Iodine Number | Hydroxyl Number |
| | | | | ° F. | | |
| Original palm oil | 6.3 | 7.2 | (¹) | 142 | 56.6 | 3 |
| Interesterified palm oil | 23.3 | 2.9 | 115 | 154 | 65.5 | 41 |

¹ Not determined on this sample but an average result on palm oil such as used in this example would be less than 5.

It will be observed that the interesterification process resulted in a concentration of saturated fatty acids in glycerides consisting mainly of saturated diglycerides.

In place of the methanol, an equivalent quantity of glycol, glycerol, ethanol, or other alcoholic substance may be employed with substantially the same result.

*Example 3.—Cottonseed oil—alcoholized with glycerol just prior to interesterification at 70° F.*

500 parts refined, filtered, and dried cottonseed oil having an iodine number of 110.4 were placed in a closed container equipped with a nitrogen inlet, a thermometer, a tube for admitting catalyst, a tube for admitting glycerol, and a stuffing box for the shaft of a high speed agitator. With the oil at 120° F. and with air excluded from the container by means of a stream of nitrogen passing therethrough, 2.4 parts of sodium methoxide in the form of a finely divided suspension in xylene were added while the oil was vigorously agitated. After the catalyst had been thoroughly mixed with the oil, 12.5 parts of dried glycerol were added over a period of about 10 minutes, with continued agitation.

The mixture was agitated for an additional 30 minutes at 120° F. to permit the alcoholysis of triglycerides by the added glycerol. The mixture was then chilled with the aid of ice water until the temperature of the glycerides was below 60° F. and considerable clouding had occurred. The contents of the container were thereafter gently agitated in a constant temperature room held at 70° F.

At the end of 3 days the glyceride mixture had become semi-solid. The catalyst was then inactivated by mixing the glyceride mixture with about 3 parts of glacial acetic acid. Thereafter the glycerides were melted and washed thoroughly with hot water, then heated for one hour at 120 to 130° F. under reduced pressure with nitrogen bubbling through the glycerides to dry the balance consisting principally of saturated diglycerides.

*Example 4.—Cottonseed oil—alcoholized with various amounts of glycerol just prior to interesterification*

Three runs employing the same cottonseed oil of Example 3 were made, using respectively 2.5, 5.0 and 10.0% glycerol. The conditions were the same as in Example 3 except that after chilling the alcoholized reaction mix the interesterification was permitted to take place for 3 days at 90° F., then one day at 80° F. with agitation, after which it was held without agitation for 2 days at 80° F., 4 days at 70° F., 4 days at 60° F., and 3 days at 50° F. The products were then acidulated to inactivate the catalyst and worked up as in Example 3. The products had the following characteristics:

| | Interesterification after alcoholysis with— | | |
|---|---|---|---|
| | 2.5% Glycerol | 5% Glycerol | 10% Glycerol |
| Cloud point, ° C | 50.1 | 50.3 | 45.4 |
| Capillary melting point, ° C | 55.3 | 55.1 | 61.0 |
| Solid fraction from a solution in 10 volumes of petroleum ether stored at 40° F.: | | | |
|   Per cent Yield | 22.6 | 24.8 | 22.4 |
|   Melting point (capillary) | 67.2 | 66.5 | 71.5 |
|   Iodine number | 12.2 | 17.6 | 5.6 |
|   Hydroxyl number | 99 | 104 | 313 |
|   Per cent combined glycerin | 15.5 | 15.5 | 26.3 |
|   Per cent monoglyceride estimated | 4 | 7 | 95 |

The above characteristics show that the solid fraction resulting from the interesterification process after alcoholysis with 2.5% and 5% glycerol was principally diglyceride, whereas the solid fraction resulting from the use of 10% glycerol was principally monoglyceride.

It is to be noted from the above that in the operation of the present invention differences in solubility of various glycerides formed are made to serve a useful purpose, that of directing the course of the interesterification and alcoholysis reactions to yield, for example, substantially completely saturated mono- and diglycerides. The invention has been illustrated mainly with the use of mixed glycerides of natural origin constituted of combined saturated and unsaturated fatty acids, but the invention is not limited thereto. For example, the invention may be applied to the interesterification of glycerides which are constituted of combined fatty acids differing in molecular weight instead of in degree of saturation, or differing in any other respects affecting solubility of glycerides of the fatty acids in the glyceride system. Moreover, because mono- and diglycerides formed of a single fatty acid differ from each other and from the corresponding triglyceride in solubility in a glyceride system, it is possible to apply the invention so as to direct the formation of mono- or diglycerides in a glyceride system constituted of a single combined fatty acid.

When the differences in solubility of the constituents of the glyceride system are small, as may be the case when the glycerides being processed are made up of only one fatty acid or of fatty acids differing only slightly in molecular weight, then it is more difficult to direct the reaction effectively, and in such a situation the use of an inert fat solvent such as pentane, hexane, ethyl ether, benzene, Skellysolve, carbon tetrachloride, pyridine, and the like, which will show little or no activity toward either the glyceride or the catalyst is valuable as a reaction medium in which the reaction may be conducted. The use of such solvents permits the use of lower temperatures of reaction than otherwise could be used, and magnifies differences on which efficient operation of the present process depends. In special cases the use of solvent has other advantages, such as of facilitating the separation of solid and liquid fractions at the end of the reaction when such separation is desired.

The time required for reaching equilibrium in the low temperature interesterification process herein described will vary accordingly to the quantity and kind of catalyst employed and other conditions of processing. In general I have found that with normal catalyst usage as described below, the greater proportion of the reaction takes place within 24 hours when temperatures from 80° F. to 120° F. are employed. At lower temperatures, such as 30° F. for example, a longer time, such as 72 to 96 hours, may be necessary to obtain the desired completeness of reaction. If a maximum conversion of the solid constituents of the glycerides to solid mono- and/or diglycerides is desired, then it may be necessary to permit the interesterification with simultaneous crystallization of solid mono- and/or diglyceride to take place for even a longer period of time, and such may be done without harmful effect.

The temperature schedule employed in conducting the interesterification reaction in accordance with the present practice is not a limitation of the invention in its broadest aspects. Although any given temperature at which simultaneous interesterification and crystallization will take place may be used at the start of the process and maintained substantially stationary until desired interesterification is obtained, it is also possible to conduct the process so that a gradual reduction in temperature occurs as the reaction proceeds. The temperature schedule can also be controlled so that the precipitation of the solid mono- and/or diglycerides approaches or reaches a state of equilibrium at a series of successively lower temperatures.

In the examples I have shown the use of sodium methoxide as catalyst for the interesterification reaction, but effective practice of the invention does not depend upon the use of this particular compound. Any material which will promote interesterification at the low temperatures required for crystallization of the mono- and/or diglyceride is suitable for use.

It is not unlikely that the true catalyst for the interesterification reaction is not the alkoxide or other compound added to the glyceride mixture but rather a compound resulting from the reaction of such added compound with the glyceride.

My experience has led me to the conclusion that the formation of active catalyst in the glyceride mixture can take place either by direct reaction of alkali metal with mono-, di- or triglycerides, or by the reaction of one or more of a great number of compounds which are capable of forming alkoxides by reaction with alcoholic substances. Such compounds will form alkoxides and will react with fats to form active catalyst when the material with which the metal or other cation is combined is not so acidic as to hold the cation in combination and prevent reaction with glyceride.

Thus, for example, potassium or sodium in combination with practically any material less acidic than phenol can form the catalyst when added to the glyceride. Sodium phenoxide appears to be on the borderline between what may be referred to in the present sense as active and inactive materials because only slight activity of this material in low temperature interesterification is noted when liberal quantities are added to the glyceride mixture. Compounds of sodium with materials more acidic than phenol (with fatty acids for example in the form of soap) will not react with the fat to form an active catalyst at the temperatures required in the practice of this invention.

In the above examples I have chosen to illustrate my process with the use of an alkoxide compound such as sodium methoxide. This specific compound is a practical material for use in promoting the interesterification in accordance with my invention because of the ready occurrence of the raw materials and its ease of preparation, and therefore the major portion of my work on interesterification processes involving application of the principles set forth herein has included the use of sodium methodide. However the methoxides of other alkali metals, such as lithium and especially potassium, are also active in forming catalytic materials with the glycerides. The methoxides of alkaline earth metals, such as calcium, also have been found to possess some activity in the range of temperatures required for the reaction. My work has also indicated that methoxides in which the cation is the tetrasubstituted ammonium radical, such as tetramethyl ammonium methoxide and lauryl benzyl ammonium methoxide, also show activity in the reaction of the present invention.

In addition to the methoxides, the corresponding ethoxides, propoxides, butoxides and alkoxides made from alcoholic compounds in general such as lauryl alcohol, ethylene glycol, mono- and diglycerides of the glyceride mixture, and others may be employed. Moreover, I have discovered that the addition of alkali-metal-organic compounds containing the alkali metal atom directly bound to a carbon atom as in triphenylmethyl sodium or to a nitrogen atom as in potassium pyrrole will result in the promotion of interesterification as conducted by the present process. The addition of a suspension of finely divided metallic potassium or sodium in xylene or of an anhydrous suspension of potassium hydroxide in a hydrocarbon solvent consisting essentially of undecane has also resulted in the promotion of the interesterification reaction at low temperature.

Because of the great variety of materials that may be used to form the active catalyst and because the actual structure of the catalytic materials formed is as yet not accurately known, the catalytic materials are generically referred to in the claims as low temperature interesterification catalysts.

Amounts of catalytic material equivalent to 0.5 per cent by weight of sodium methoxide based on the weight of the glyceride mixture may be employed, but there is no particular advantage in employing quantities much in excess of 0.2 per cent, assuming of course that all of the catalyst added is available for promoting the reaction. Even small quantities, such as 0.03 per cent, are effective at low temperature, but I have found that the reaction proceeds at a rather low rate unless at least 0.05 per cent is employed. The preferred range of catalyst usage is the equivalent from about 0.05 per cent to about 0.5 per cent sodium methoxide.

The addition of the catalytic material to the glyceride mixture is preferably conducted in such a way that uniform distribution throughout the glyceride mixture in a finely dispersed phase results. The examples above show the use of a solution of sodium methoxide in anhydrous methanol and a fine dispersion of sodium methoxide in xylene. It may be especially convenient to store the catalyst in the form of a dispersion in an inert solvent such as xylene, toluene, petroleum naphtha, etc., and such dispersions may be dispersed readily in the glyceride mixtures. The dispersion may be prepared by the reaction of powdered sodium and alcoholic substance in stoichiometric amounts in the solvent itself prior to the addition thereof to the glyceride mixture. In the case of catalytic materials that can be prepared in powdered form, such as powdered sodium methoxide, the powdered material may be mixed with the fat without the use of a carrier.

When the highly reactive catalytic materials referred to herein are employed to promote the interesterification reaction in the practice of the process, it is desirable that the glyceride mixture any any added alcoholic hydroxy substance be essentially free from moisture, oxygen, fatty acids, carbon dioxide, peroxides, and so forth, so as to avoid decomposition of the catalytic material to such an extent as would reduce the content of same to an ineffective amount.

Because of the high degree of activity of the catalytic materials employed in the present process, it is preferable to render the same inactive after the desired interesterification has taken place and before the temperature of the glyceride mixture is allowed to rise appreciably so that substantially no modification of the interesterification results during subsequent handling of the glyceride mixture. I have noted, for example, that merely heating the interesterified glyceride mixture in the presence of active catalyst to a temperature at which the crystallized portion becomes liquid permits an undesirable reverse rearrangement in which the saturated mono- and/or diglyceride content decreases. Thus in order to retain the desired degree and kind of interesterification effected at low temperature, it is preferable to treat the mixture containing the catalyst with an inactivating material, for example an acid reacting compound such as hydrochloric acid, phosphoric acid, carbonic acid, glacial acetic acid, etc., or water, aqueous solutions, etc., and thereby inactivate the catalyst before any undesirable reverse interesterification takes place. If the glyceride mixture resulting from the interesterification process is fairly fluid, as in the condition of a slurry, treatment with the acid material is a simple procedure. If, however, the glyceride mixture is solid after interesterification, or substantially so, it may be necessary to reduce it to granular form before treatment with the acid in order to inactivate the catalyst effectively. While it may be desirable in some instances to employ directly the glyceride mixture containing the solid mono- and/or diglycerides in the manufacture of desired products, in other instances it may be advantageous to effect separation of the solid and liquid glycerides. For example, if the glyceride mixture after interesterification is in the form of a solid-liquid two-phase system in which substantial proportions of each phase are present, and separation into solid and liquid fractions is desired, the interesterified glycerides may be directly subjected to filter pressing or other means of separation without prior inactivation of the catalyst, provided the conditions of separation such as temperature, etc. are such that no undesirable changes in the result of the interesterification process take place. After separation of the fractions, the catalyst may be inactivated as suggested above.

Greater freedom in the separation of the interesterified glyceride mixture into solid and liquid fractions is available if the catalyst in the interesterified product is first inactivated, thereby permitting subsequent remelting of the glycerides, fractional crystallization thereof with or without the aid of a solvent, and separation of liquid from solid to any desired extent.

Basically the process of the present invention constitutes a rather efficient method of concentrating the higher melting constituents and the lower melting constituents into separate fractions, and its many applications in industrial practices will be aware to those versed in the art.

For example, the process may be employed in the separation of tallow and similar fats into commercial stearic acid and red oil (principally oleic acid). In such an application the tallow is preferably converted to a mono-diglyceride mixture which is then subjected to interesterification with simultaneous crystallization of the mono-diglycerides of the higher melting fatty acids. After separation of the solid from liquid fraction, the glycerides in the respective fractions may be split to form fatty acid and glycerol, which can be reused in the alcoholysis reaction. The solid fraction yields a fatty acid mixture which is suitable for use as a commercial stearic acid and the liquid fraction yields a fatty acid mixture which is suitable for use as a commercial red oil. By application of such process several costly steps in the normal process of producing stearic acid and red oil are omitted, such as for example repeated panning and hot pressing.

The process also provides means for the low cost production of high or low titer fats for soap manufacture. For example if a low titer soapstock is desired, the crystallized solid mono- and/or diglycerides resulting from the interesterification process as applied to cottonseed oil or soybean oil may be separated from the more liquid constituents which also will contain unesterified hydroxyl groups. This liquid fraction can then be saponified with caustic soda or other alkali to yield a low titer soap. Obviously the process is sufficiently flexible so that it may be controlled to give liquid fractions of any desired titer characteristics. In the same way the crystallized fraction may be converted into a high titer soap.

The process also finds use in the manufacture of unsaturated oils suitable for use in the drying oil industry. For example a paint oil may be prepared from the liquid fraction resulting from the practice of the present invention on drying oils such as linseed oil, on semi-drying oils such as soybean oil, cottonseed oil, corn oil, rapeseed oil and others and also on fish oils such as menhaden oil, sardine oil, salmon oil, pilchard oil, and the like, by esterifying unesterified hydroxyl groups in this fraction with the fatty acid of a drying oil, the corresponding halide, or with an acid substance such as phthalic anhydride whereby the average molecular weight of the glyceride is increased without reducing its degree of unsaturation.

In the preceding description the invention has been applied to a number of specific fats well known in the art, but it is to be understood that all natural fats including animal, vegetable, and marine fats as well as synthetic fats will respond to the instant method of treatment and are to be considered as included in the scope of the following claims when generic terms are employed.

Having thus described my invention, what I claim and desire to secure by Letters Patent is:

1. A process of interesterification comprising intimately contacting a fatty acid glyceride with a low temperature interesterification catalyst in the presence of an organic compound, which is (1) compatible with said catalyst, (2) has at least one unesterified alcoholic hydroxyl group and (3) is at least partially soluble in said glyceride, at a temperature, below 180° F., at which a substantial proportion of the glyceride is liquid, to cause rearrangement of the fatty acid radicals in the glyceride molecules, the temperature being sufficiently low to permit crystallization of solid glycerides of low solubility of the group consisting of mono- and diglycerides as such solid glycerides are formed.

2. The process of claim 1 in which the reaction is conducted in the presence of an inert solvent.

3. A process of interesterification comprising intimately contacting glycerides of a mixture of fatty acids whose molecular structures differ in respects affecting solubility of glycerides thereof in the glyceride system, with a low temperature interesterification catalyst, in the presence of an organic compound, which is (1) compatible with said catalyst, (2) has at least one unesterified alcoholic hydroxyl group and (3) is at least partially soluble in said glycerides, at a temperature below 180° F. and within a range of which the lower limit is the lowest temperature at which a portion of the glyceride mixture is liquid and the upper limit is the highest temperature at which high melting glycerides of the group consisting of mono- and diglycerides can crystallize in the liquid glycerides as they are formed and thereby be precluded from further interesterification, and maintaining the temperature of the mixture within the said range while progressive crystallization of the said higher melting glyceride molecules formed takes place.

4. A process of interesterification comprising intimately contacting glycerides of a mixture of fatty acids whose molecular structures differ in respects affecting solubility of glycerides thereof in the glyceride system, with a low temperature interesterification catalyst, in the presence of a non-acid organic compound which has at least one unesterified alcoholic hydroxyl group and which is at least partially soluble in said glycerides, maintaining the temperature of the mixture below 180° F. and at a temperature at which at least part of the glyceride mixture is in liquid condition and at which the liquid glycerides become saturated with respect to higher melting component solid glycerides of the group consisting of mono- and diglycerides, whereby said solid glycerides crystallize, and progressively lowering the temperature of the reaction mixture to promote further crystallization of said solid glycerides as formed.

5. A process of interesterification comprising intimately contacting a mixture of (1) glycerides of a mixture of fatty acids whose molecular structures differ in respects affecting solubility of glycerides thereof in the glyceride system, a substantial proportion of glycerides being in molten condition, and (2) an added non-acid organic compound which has at least one unesterified alcoholic hydroxyl group and which is at least partially soluble in said glycerides, with a low temperature interesterification catalyst at a temperature below 180° F. and sufficiently low that solid glycerides of the group consisting of mono- and diglycerides will crystallize from solution in the molten glycerides, the said interesterification being continued with crystallization of such solid glycerides formed in the reaction and with corresponding increase in the proportion thereof in the glyceride mixture.

6. The process of claim 5 in which component (2) of the mixture is an organic non-acid monohydric alcoholic compound.

7. The process of claim 5 in which component (2) of the mixture is a non-acid polyhydric alcoholic compound.

8. The process of claim 5 in which component (2) of the mixture is a mono-fatty acid ester of glycerol.

9. A process of combined alcoholysis and interesterification comprising intimately contacting a mixture of (1) glycerides of a mixture of fatty acids whose molecular structures differ in respects affecting solubility of glycerides thereof in the glyceride system, a substantial proportion of glycerides being in molten condition, and (2) glycerol, with a low temperature interesterification catalyst at a temperature below 180° F. to alcoholize the glycerides, then continuing the contact at a lower temperature sufficiently low that solid glycerides of the group consisting of mono- and diglycerides will crystallize from solution in the molten glycerides, the said interesterfication being continued with crystallization of such solid glycerides formed in interesterification and with corresponding increase in the proportion thereof in the glyceride mixture.

10. A process of separating a substantial proportion of combined saturated fatty acids in a glyceride mixture in the form of saturated glycerides of the group consisting of mono- and diglycerides, which comprises contacting a mixture of (1) glycerides of a mixture of saturated and unsaturated fatty acids and (2) a non-acid organic compound having at least one unesterified alcoholic hydroxyl group and being at least partially soluble in said glycerides, with a low temperature interesterification catalyst at a temperature below 180° F. at which a substantial proportion of the glyceride mixture is liquid and sufficiently low that saturated glycerides of the group consisting of mono- and diglycerides crystallize from solution in the glyceride mixture, the reaction being accompanied by progressive crystallization of said saturated glycerides as the same are formed in the reaction, and separating the solid and liquid fractions.

11. A process of separating a substantial proportion of combined saturated fatty acids in a glyceride mixture in the form of saturated glycerides of the group consisting of mono- and diglycerides, which comprises contacting a mixture of (1) glycerides of a mixture of saturated and unsaturated fatty acids and (2) a non-acid organic compound having at least one unesterified alcoholic hydroxyl group and being at least partialy soluble in the said glycerides, with a low temperature interesterification catalyst at a temperature below 180° F. at which a substantial proportion of the glyceride mixture is liquid and sufficiently low that saturated glycerides of the group consisting of mono- and diglycerides crystallize from solution in the glyceride mixture, the reaction being accompanied by progressive crystallization of said saturated glycerides as the same are formed in the reaction, and inactivating the catalyst, heating the reacted mixture to render the same wholly liquid, cooling the mixture and crystallizing the higher melting solid glycerides to form desired solid and liquid fractions and separating the solid and liquid fractions.

12. The process of claim 1 in which the catalytic material employed is selected from the group consisting of alkali metal alkoxides, teraammonium substituted alkoxides, and substances which form alkoxides by reaction with alcoholic compounds.

13. A process of interesterification comprising contacting glycerides of a mixture of fatty acids whose molecular structures differ in respects affecting solubility of glycerides thereof in the glyceride system with a finely dispersed metal alkoxide catalyst in the present of a dissolved alcoholic substance of the group consisting of mono- and diglycerides, a substantial proportion of the glycerides in the mixture being in molten condition, at a series of successively lower temperatures below 180° F. and sufficiently low to permit crystallization of relatively insoluble solid glycerides of the group consisting of mono- and diglycerides progressively during the reaction.

14. The process of claim 1 in which the rearrangement is conducted under a blanket of inert gas.

EDDY W. ECKEY.

REFERENCES CITED

The following references are of record in the file of this patent:

UNITED STATES PATENTS

| Number | Name | Date |
|---|---|---|
| 2,200,391 | Freeman | May 14, 1940 |
| 2,205,381 | Eckey | June 25, 1940 |
| 2,308,848 | Young et al. | Jan. 19, 1943 |
| 2,309,949 | Gooding | Feb. 2, 1943 |
| 2,340,104 | Brown | Jan. 25, 1944 |

---

Certificate of Correction

Patent No. 2,442,534.

June 1, 1948.

EDDY W. ECKEY

It is hereby certified that errors appear in the printed specification of the above numbered patent requiring correction as follows: Column 9, line 46, for the word "accordingly" read *according*; column 10, line 56, for "methodide" read *methoxide*; column 11, line 58, for "any any" read *and any*; column 15, line 25, claim 11, for "partialy" read *partially*; column 16, lines 3 and 4, claim 12, for "teraammonium" read *tetraammonium*; line 12, claim 13, for "present" read *presence*; and that the said Letters Patent should be read with these corrections therein that the same may conform to the record of the case in the Patent Office.

Signed and sealed this 14th day of September, A. D. 1948.

[SEAL]

THOMAS F. MURPHY,
*Assistant Commissioner of Patents.* ture of (1) glycerides of a mixture of saturated and unsaturated fatty acids and (2) a non-acid organic compound having at least one unesterified alcoholic hydroxyl group and being at least partially soluble in said glycerides, with a low temperature interesterification catalyst at a temperature below 180° F. at which a substantial proportion of the glyceride mixture is liquid and sufficiently low that saturated glycerides of the group consisting of mono- and diglycerides crystallize from solution in the glyceride mixture, the reaction being accompanied by progressive crystallization of said saturated glycerides as the same are formed in the reaction, and separating the solid and liquid fractions.

11. A process of separating a substantial proportion of combined saturated fatty acids in a glyceride mixture in the form of saturated glycerides of the group consisting of mono- and diglycerides, which comprises contacting a mixture of (1) glycerides of a mixture of saturated and unsaturated fatty acids and (2) a non-acid organic compound having at least one unesterified alcoholic hydroxyl group and being at least partialy soluble in the said glycerides, with a low temperature interesterification catalyst at a temperature below 180° F. at which a substantial proportion of the glyceride mixture is liquid and sufficiently low that saturated glycerides of the group consisting of mono- and diglycerides crystallize from solution in the glyceride mixture, the reaction being accompanied by progressive crystallization of said saturated glycerides as the same are formed in the reaction, and inactivating the catalyst, heating the reacted mixture to render the same wholly liquid, cooling the mixture and crystallizing the higher melting solid glycerides to form desired solid and liquid fractions and separating the solid and liquid fractions.

12. The process of claim 1 in which the catalytic material employed is selected from the group consisting of alkali metal alkoxides, teraammonium substituted alkoxides, and substances which form alkoxides by reaction with alcoholic compounds.

13. A process of interesterification comprising contacting glycerides of a mixture of fatty acids whose molecular structures differ in respects affecting solubility of glycerides thereof in the glyceride system with a finely dispersed metal alkoxide catalyst in the present of a dissolved alcoholic substance of the group consisting of mono- and diglycerides, a substantial proportion of the glycerides in the mixture being in molten condition, at a series of successively lower temperatures below 180° F. and sufficiently low to permit crystallization of relatively insoluble solid glycerides of the group consisting of mono- and diglycerides progressively during the reaction.

14. The process of claim 1 in which the rearrangement is conducted under a blanket of inert gas.

EDDY W. ECKEY.

REFERENCES CITED

The following references are of record in the file of this patent:

UNITED STATES PATENTS

| Number | Name | Date |
|---|---|---|
| 2,200,391 | Freeman | May 14, 1940 |
| 2,205,381 | Eckey | June 25, 1940 |
| 2,308,848 | Young et al. | Jan. 19, 1943 |
| 2,309,949 | Gooding | Feb. 2, 1943 |
| 2,340,104 | Brown | Jan. 25, 1944 |

---

Certificate of Correction

Patent No. 2,442,534.

June 1, 1948.

EDDY W. ECKEY

It is hereby certified that errors appear in the printed specification of the above numbered patent requiring correction as follows: Column 9, line 46, for the word "accordingly" read *according*; column 10, line 56, for "methodide" read *methoxide*; column 11, line 58, for "any any" read *and any*; column 15, line 25, claim 11, for "partialy" read *partially*; column 16, lines 3 and 4, claim 12, for "teraammonium" read *tetraammonium*; line 12, claim 13, for "present" read *presence*; and that the said Letters Patent should be read with these corrections therein that the same may conform to the record of the case in the Patent Office.

Signed and sealed this 14th day of September, A. D. 1948.

[SEAL]

THOMAS F. MURPHY,
*Assistant Commissioner of Patents.*